(12) United States Patent
Simionescu et al.

(10) Patent No.: US 10,423,357 B2
(45) Date of Patent: Sep. 24, 2019

(54) DEVICES AND METHODS FOR MANAGING MEMORY BUFFERS

(71) Applicant: Avago Technologies International Sales Pte. Limited, Singapore (SG)

(72) Inventors: Horia Simionescu, Foster City, CA (US); Allen Kelton, Colorado Springs, CO (US); Timothy Hoglund, Colorado Springs, CO (US); Sumanesh Samanta, Colorado Springs, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/598,893

(22) Filed: May 18, 2017

(65) Prior Publication Data
US 2018/0335974 A1      Nov. 22, 2018

(51) Int. Cl.
*G06F 3/06* (2006.01)
*G06F 12/0866* (2016.01)

(52) U.S. Cl.
CPC ............ *G06F 3/0656* (2013.01); *G06F 3/061* (2013.01); *G06F 3/0611* (2013.01); *G06F 3/0658* (2013.01); *G06F 3/0659* (2013.01); *G06F 3/0683* (2013.01); *G06F 12/0866* (2013.01)

(58) Field of Classification Search
CPC ......... G06F 3/0656; G06F 13/12; H04L 12/66
See application file for complete search history.

(56) References Cited

U.S. PATENT DOCUMENTS

| 6,631,446 B1 | 10/2003 | Cherkauer et al. |
| 6,822,966 B2 | 11/2004 | Putcha et al. |
| 7,245,586 B2 | 7/2007 | Bitar et al. |
| 9,008,113 B2 * | 4/2015 | Pope ..................... G06F 13/128 370/419 |

\* cited by examiner

*Primary Examiner* — Gary W. Cygiel
(74) *Attorney, Agent, or Firm* — Sheridan Ross P.C.

(57) ABSTRACT

A method for managing a pool buffers includes establishing a first buffer class with a first allowable number of buffers, and a first reserved number of buffers that are reserved for the first buffer class in the pool of buffers even if no Input/Output (I/O) operation is running in connection with the first buffer class. The method includes establishing a second buffer class with a second allowable number of buffers, and a second reserved number of buffers that are reserved for the second buffer class in the pool of buffers even if no I/O operation is running in connection with the second buffer class. The first buffer is enabled class to have more than the first allowable number of buffers as long as a number of buffers allocated to the second buffer class is fewer than the second allowable number of buffers.

20 Claims, 9 Drawing Sheets

DEVICES AND METHODS FOR MANAGING MEMORY BUFFERS

FIELD OF THE DISCLOSURE

The present disclosure is generally directed to devices and methods for managing memory buffers, for example, in a cached environment.

BACKGROUND

In a storage controller, a dynamic random access memory (DRAM) buffer pool is used to de-stage writes to memory devices, such as a hard disk drive (HDD), a solid state drive (SSD), etc. to provide fast response to the upper layers, and can also be used as a read cache. In a mixed topology, where the storage controller is connected to both a solid state drive (SSD) and an HDD (or some other fast and slow storage mediums) SSD and HDD Virtual Drives (VDs)s share the same DRAM buffer pool. Since SSD VDs can flush and de-stage data faster from DRAM, buffers corresponding to SSD VDs are freed up much faster than HDD VDs. These newly freed buffers can in turn be taken by incoming HDD input/output (I/O) requests, which rapidly fills all of the buffers in the pool and leads to severe starvation and lower performance for the SSDs.

Also, in many storage applications, there are workloads for which low write latency takes priority. Typically, these are low queue depth workloads, and the success of providing low latency depends on the availability of free buffers for incoming writes. Thus, low latency workloads will suffer if other workloads use all the buffers in the pool, and the storage controller must wait for free buffers.

One way of addressing the above problem may be to introduce a hard partition of the buffers between HDD, SSD and Low Latency workloads. However, this scheme is wasteful and suboptimal when any of the three workloads are either not present or idle. In that case, the reserved buffers for each idle or unused workload are unutilized even though the buffers could have been better utilized by some other workload that may be starved for extra buffers. Accordingly, it is desired to introduce a flexible buffer management scheme that reacts smoothly and automatically to changes in buffer demand, which can lead to a reduction of wasted buffer space.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "includes," "including," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

With reference to FIGS. 1-9, various embodiments of the present disclosure will be described. While many of the examples depicted and described herein will relate to a hybrid topology (HHD and SSD), it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a HDD/SSD storage controller or some other type of device used in a communication system). In particular, hard drives, hard drive controllers (e.g., SCSI controllers, SAS controllers, RAID controllers, etc.) may be configured to implement example embodiments. As another example, network cards or the like having cache memory may also be configured to implement example embodiments.

Figure 1:
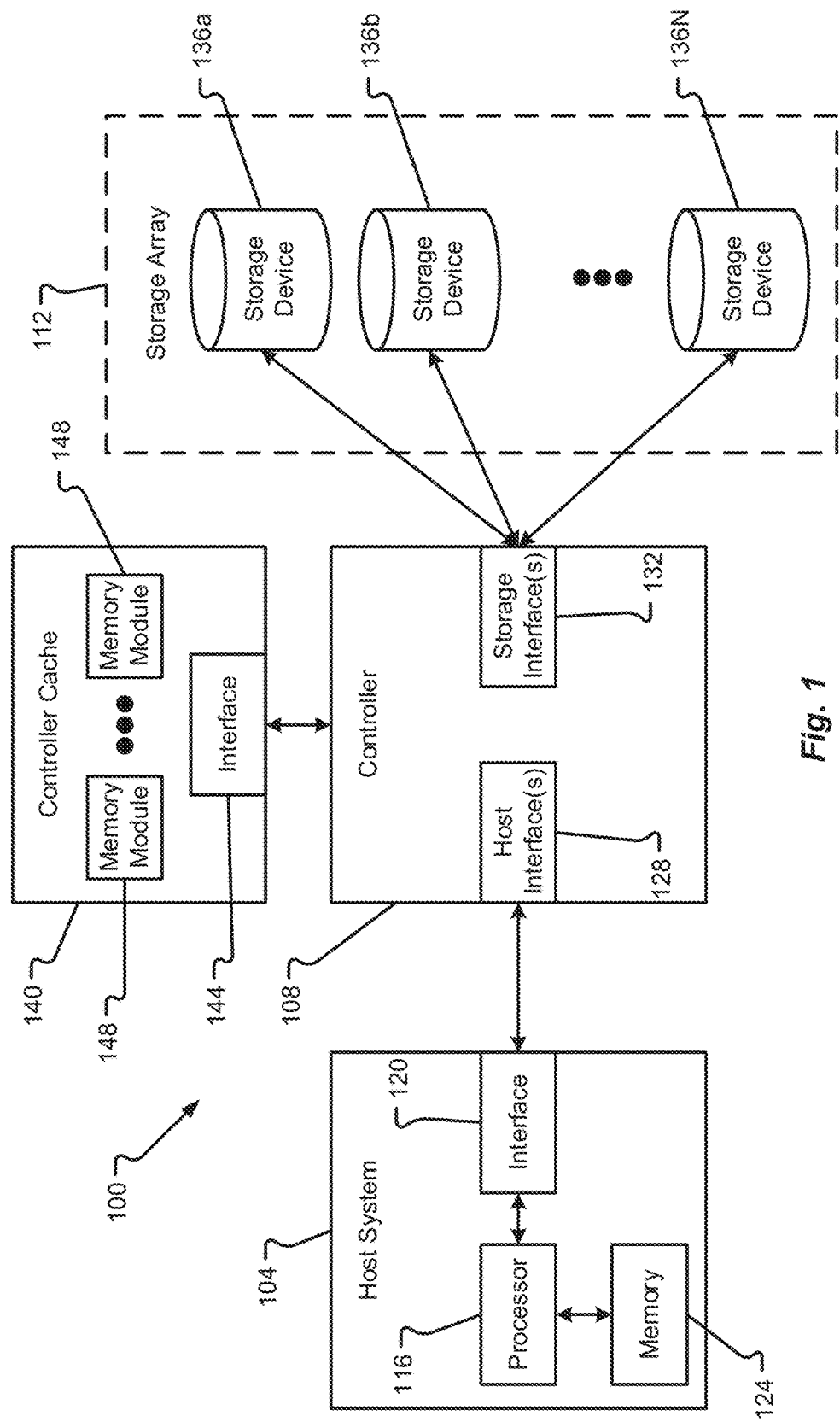
FIG. 1 is a block diagram depicting a computing system in accordance with at least one example embodiment.

With reference now to FIG. 1, details of a computing system 100 capable of implementing a buffer management scheme according to example embodiments will be described. The computing system 100 is shown to include a host system 104, a controller (or storage controller) 108 (e.g., a HDD/SSD controller, a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a mixed HDD/SSD architecture) should not be construed as limiting example embodiments. If implemented as a RAID architecture, however, it should be appreciated that any type of RAID scheme may be employed (e.g., RAID-0, RAID-1, RAID-2, . . . , RAID-5, RAID-6, etc.).

One or more of the storage devices 136a-N may also be used to store error correction or parity information. In each row, one of the storage devices 136a-N is assigned to store a certain checksum, a so called parity function, which is calculated based on the data from other member disks in the row. In case of a single disk failure, the missing data can be calculated using the parity. In such a way fault tolerance is provided.

Theoretically, the maximum number of the storage devices/disks is not limited, but in practice, one takes into account the controller capacity. The capacity of the array is (N−1) times the size of the smallest member storage device/disk for the array of N storage devices/disks. Thus, the capacity of one storage device/disk is used to store the parity function data to provide fault tolerance.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of example embodiments. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter. Example embodiments also apply to single drives exposed as is to a host, but that has a DRAM cache.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 or a smaller number of cache memory modules 148. The memory modules 148 may correspond to flash memory, RAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired. According to example embodiments, each memory module 148 may include a plurality of buffers (collectively referred to as a pool of buffers) and correspond to a particular buffer class. However, example embodiments are not limited thereto. For example, a buffer class may span across multiple memory modules 148 and/or multiple buffer classes may reside in a single memory module 148. The controller 108 implements one or more buffer management schemes to control allocation of the buffers in each buffer class and across buffer classes. FIGS. 2-9 describe a buffer management scheme in more detail below.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
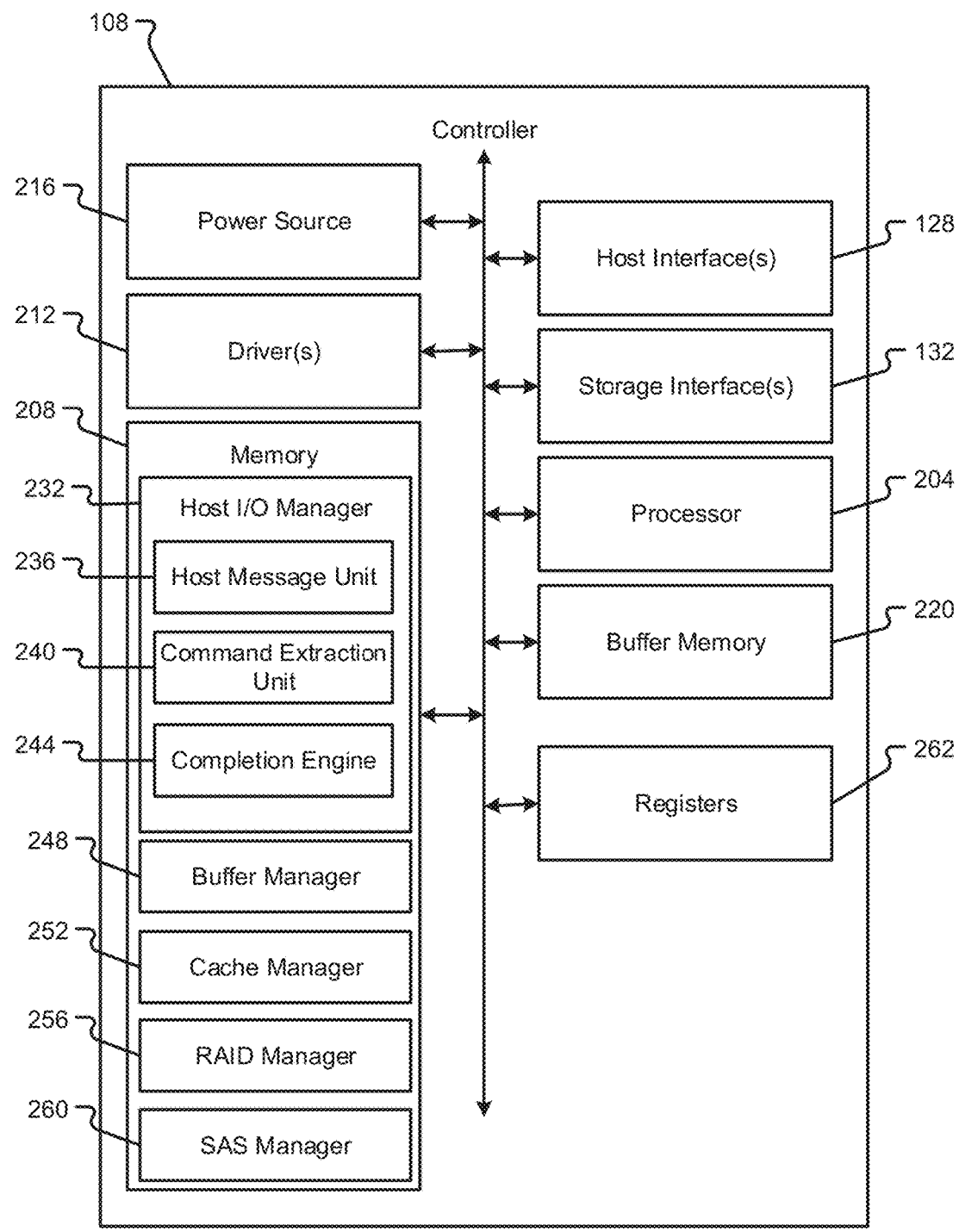
FIG. 2 is a block diagram depicting details of an illustrative controller in accordance with at least one example embodiment.

With reference now to FIG. 2 additional details of a controller 108 will be described in accordance with at least one example embodiment. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of example embodiments.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of example embodiments. The host I/O manager 232, when executed, enables the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an MPI protocol. The host message unit 236 may bring down the messages received from the host system 104 and pass the content of the messages to the command extraction unit 240. The command extraction unit 240 may be configured to determine if a particular command in a message is accelerable (e.g., capable of being passed to a particular functional block to facilitate hardware acceleration). If a command is determined to be accelerable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands. The cache manager 252 may also enable the processor 204 to communicate with the controller cache 140 and leverage the memory modules 148 of the controller cache 140. The cache manager 252 may also manage the creation and lifecycle of cache frame anchors for rows 228, cache frame anchors for strips 230, and/or ISGLs 224. As an example, as caching functions are executed, one or more data structures 228, 230 may be created or utilized to facilitate the caching function.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if not caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

One or more registers 262 are used to track various aspects of the buffer management scheme in accordance with example embodiments. For example, the registers 262 set and/or track the number of buffers within each classification of regions of buffers and set and/or track a lending policy associated with a buffer class, as described in more detail below. Although registers 262 are shown as being part of the controller 108, it should be understood that the registers may be provided separately from the controller 108, such as in the controller cache 140 if the controller cache 140 is separate from the controller 108.

FIGS. 3-7 illustrate aspects of a buffer management scheme in accordance with at least one example embodiment. The buffer management scheme may be implemented by the processor 204 executing buffer manager routines 248. As noted above, the memory modules 148 include a plurality of buffers and each memory module 148 may correspond to one of a plurality of buffer classes. Further, the processor 204 executes buffer manager routines 248 to control allocation of the buffers within and across the plurality of buffer classes.

For the sake of description, FIGS. 3-7 illustrate four Buffer Classes 0-3, which may be associated with fast, medium, slow, and low-latency I/O operations, respectively. However, example embodiments can apply to any number of buffer classes associated with any type of I/O operation. Regardless of their association to a type of I/O operation, the buffer classes are controlled using the same logic, but can be configured differently by the processor 204.

FIGS. 3-7 are described with reference to several terms that have the following definitions. Assuming there are n buffer classes, the buffer classes will have the following initial configurations/variables (e.g., accomplished using registers set by firmware of the system).

Allowance[n]: Allowance refers to the initial number of buffers assigned to a particular buffer class (or a allowable number of buffers allocatable to the buffer class). A buffer class has this many buffers earmarked initially, and if the buffer class requests more buffers, the requesting buffer class can borrow from the allowance of another buffer class based on rules if there are buffers to spare (discussed in further detail with reference to FIGS. 3-7). That is, the requesting buffer class may be allowed to exceed the allowance (or allowable number of buffers). A number of "allocatable" buffers indicates a number of buffers available to be allocated (see definition of allocated below). The allowance may be a design parameter set based on empirical evidence and/or user preference.

Reserved[n]: Even if no I/O operations are running, a given number of reserved buffers are present for each buffer class. Thus, the reserved buffers in each buffer class are untouchable and are not available to be borrowed by other buffer classes. Reserved buffers ensure that even if a buffer class is idle for a period of time and then reactivates, the buffer class is guaranteed to immediately have least this many buffers available for I/O operations. The reserved number of buffers may be a design parameter set based on empirical evidence and/or user preference.

Allocated[n]: The allocated number of buffers is the number of buffers allocated to a given buffer class at any given time. This is the actual number of buffers being used by the buffer class. The allocated number of buffers can exceed the number of buffers in the allowance, as described in more detail below.

Guaranteed[n]: Guaranteed buffers are used when a buffer class is active and using more buffers than the reserved buffer count. The guaranteed buffers function as "head room" in front of the current allocation for a buffer class or the initial buffer allowance. There is an initial setting for the number of guaranteed buffers, but as buffers are allocated and buffer classes reach their allowance, the number guaranteed buffers shrinks, eventually becoming zero when a number of allocated buffers is equal to a number of buffers in the allowance. Guaranteed buffers are usually not available to be borrowed by other buffer classes. The guaranteed number of buffers may be a design parameter set based on empirical evidence and/or user preference.

Protected[n]: Protected buffers work as another layer in front of the guaranteed buffers. Similar to guaranteed buffers, there is an initial setting for the number of protected buffers, but as buffers are allocated and reach the allowance, the number of protected buffers shrinks, eventually becoming zero when a number of allocated buffers is equal to a number of buffers in the allowance minus the number of guaranteed buffers. While other buffer classes can borrow from protected buffers of a different buffer class, there are rules for allowing other buffer classes to do so. The protected number of buffers may be a design parameter set based on empirical evidence and/or user preference.

Unprotected[n]: Unprotected buffers are lendable with none or fewer of the limitations imposed on protected and guaranteed buffers. A buffer class begins allocating buffers from unprotected buffers before allocating from the protected and guaranteed buffers. The unprotected number of buffers may be a design parameter set based on empirical evidence and/or user preference.

It should be understood that the terms allowance, reserved, allocated, guaranteed, protected, and unprotected are classifications of types of buffers within each buffer class. The number of buffers in each classification is tracked and/or set for each buffer class using the registers 262.

BuffersToBeReturned[n]: When a buffer class exceeds its allowance, the buffer class should return some buffers in order to get more buffers. This value can be variable and dynamically calculated based on an applied lending policy, empirical evidence, and/or user preference, and is stored in a register 262 to remember the number of buffers a given buffer class should to return before the buffer class gets a new allocation.

Buffers are generally "lendable" (or able to be borrowed) when a buffer class has unprotected or protected buffers remaining. Buffers are generally not "lendable" when a buffer class is in its guaranteed range.

In view of the above, it may be said that there is a relationship between configured numbers of buffers, an allocated amount, and lendable amount. That is, as a buffer class uses up its allowance of buffers, its unprotected region shrinks to zero, then its protected region shrinks to zero, then its guaranteed region shrinks to zero.

When a buffer class has allocated fewer buffers than the reserved amount, the buffer class has not yet established its guaranteed number of buffers. This allows other buffer classes to borrow more buffers from an inactive or mostly inactive buffer class.

As noted above, in order to implement a buffer management scheme according to at least one example embodiment, the controller 108 may include counters (e.g., registers 262) for quality of service (QoS) manager internal use.

For the sake of convenient explanation, FIGS. 3-7 are illustrated and described as if buffer borrowing occurs between buffer classes. However, it should be understood that borrowing occurs from a total pool of available buffers, not necessarily from a specific buffer class. For example, in FIGS. 3-7, it should be understood that Buffer Class 0 borrows buffers from the total pool available buffers, not necessarily from a specific buffer class. That is, in Buffer Class 1 of FIG. 7, the guaranteed number of buffers is not yet in use by Buffer Class 1, but is still in the total pool of available buffers and earmarked as being for the guaranteed buffers of Buffer Class 1. Accordingly, unallocated buffers (i.e., buffers not currently in use) throughout FIGS. 3-7 should be understood as being earmarked for a particular Buffer Class, but still in the total pool of buffers that may be available to other buffer classes for borrowing.

As noted above, the buffer management scheme follows a set of rules for managing the buffer classes. FIGS. 3-7 make reference to various polices that represent the set of rules. Example embodiments are described with reference to three policies (defined below), but it should be understood that any number of policies may be implemented based on design preferences.

As long as a buffer class is below its allowance, the buffer class can allocate new buffers without any problems. However, the moment the number of allocated buffers reaches the number of allowance buffers, whether the buffer class can allocate new buffers depends the following polices, (or lending policies) defined below.

Lending Policy 1 is applied to a borrow request when a requesting buffer class is at/above its allowance, but there is at least one other buffer class that has buffers in an unprotected state. Lending Policy 1 is the least restrictive policy.

Lending Policy 2 is applied to a borrow request when a requesting buffer class is at/above allowance, at least one other buffer class has buffers in a protected state, and no other buffer class has buffers in an unprotected state. Lending Policy 2 is more restrictive than Lending Policy 1 but less restrictive than Lending Policy 3.

Lending Policy 3 is applied to a borrow request when a requesting buffer class is at/above allowance, and at least one other buffer class has a guaranteed region squeezed (or shrunk) because another buffer class borrowed buffers. Lending Policy 3 is the most restrictive policy.

Each lending policy defines for a given number of requested buffers, how many buffers the requesting buffer class (which is over its allowance) must return in order to allocate more buffers (i.e., receive more buffers from the total pool of available buffers).

Lending Policy 1 is the least restrictive, so the amount of buffers needed to be returned by the requesting buffer class can be a small fraction of the total requested. For example, for a requesting buffer class to receive an additional 100 buffers, Lending Policy 1 may require that the requesting buffer class return 10 buffers. According to at least one example embodiment, the ratio of returned buffers to requested buffers is a power of 2. Thus, for a request of 100 additional buffers, Lending Policy 1 may require that the requesting buffer class return ¼ or ½, etc. of the requested number of buffers (i.e., return 25 buffers, 50 buffers, etc.). Keeping the ratio as a power of 2 facilitates operation of the system hardware.

Lending Policy 2 is more restrictive than Lending Policy 1, but still allows a buffer class to grow. For example, Lending Policy 2 may require that for receiving 100 additional buffers, 50 buffers need to be returned by the requesting buffer class.

Lending Policy 3 is applied when one buffer class (e.g., buffer class A) has already borrowed buffers and is above its allowance, but now another buffer class (e.g., buffer class B, which is below its allowance) requests additional buffers and wants to grow. If this pushes buffer class B inside its guaranteed region, and then buffer class A must shrink and make buffers available for buffer class B. This is ensured by forcing buffer class A to return more buffers than its demand. For example, if buffer class A requests 100 buffers, Lending Policy 3 may require buffer class A to return 150 buffers before receiving the 100 buffers.

It should be understood that the details of the Lending Policies are adjustable design parameters that are based on empirical evidence and/or user defined, and can be tracked and/or set using registers 262.

Figure 3:
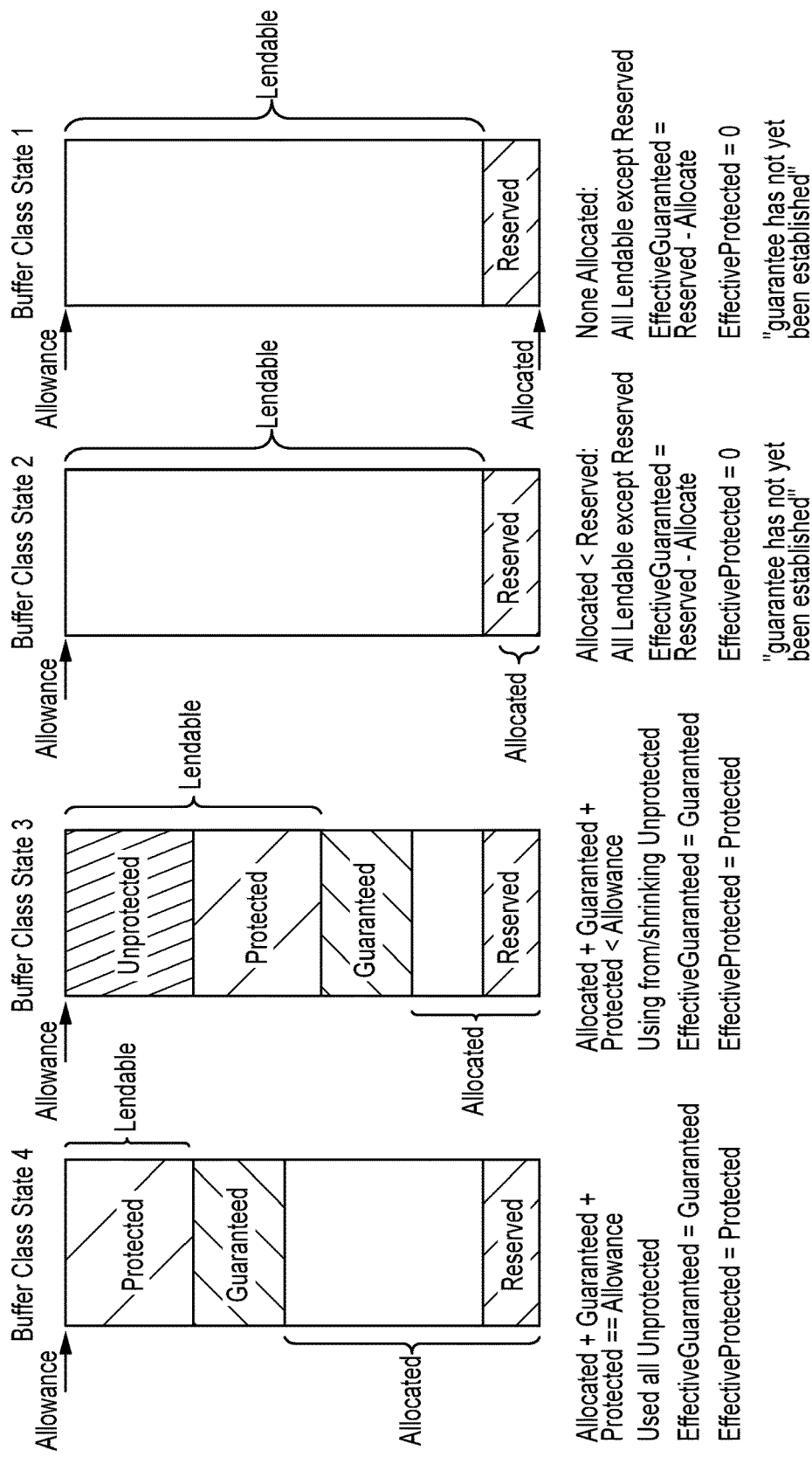
FIGS. 3 and 4 illustrate various states of a buffer class according to at least one example embodiment.
Figure 4:
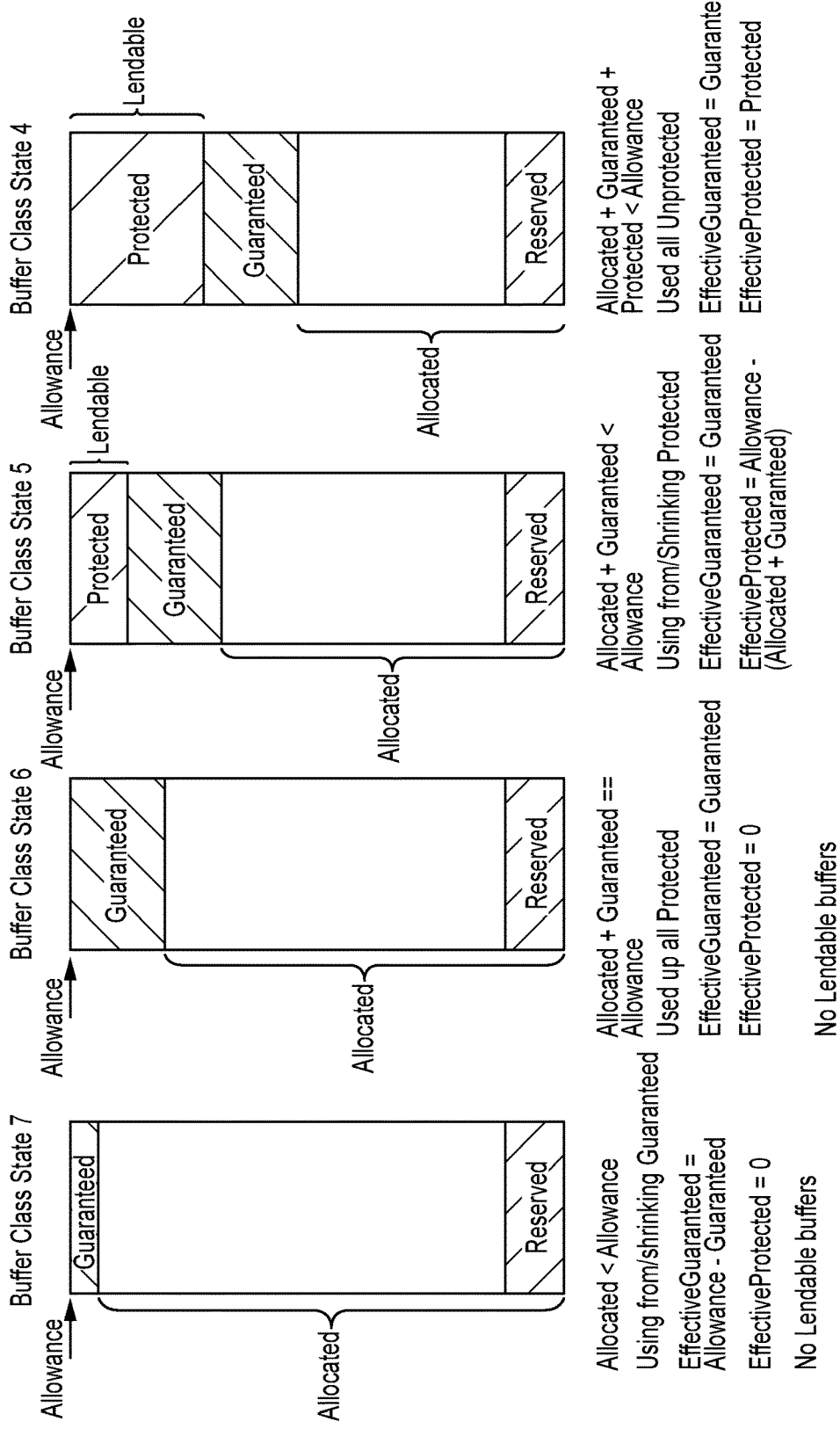

FIGS. 3 and 4 illustrate various states of a buffer class according to at least one example embodiment. FIGS. 3 and 4 illustrate seven buffer states, States 1-7, of a single buffer class, but example embodiments are not limited thereto, and there may be fewer or more buffer states as desired. A buffer class may encounter one, some, or all of States 1-7 depending on the buffer management scheme being employed.

In State 1, the buffer class includes an allowance or a allowable number of buffers that are allocatable (indicated by the "Allowance" arrow) to the buffer class and a reserved number of buffers labeled "Reserved" and has no buffers allocated from the pool of buffers. That is, the buffer class is idle or inactive and is not currently using any buffers from the pool (indicated by the Allocated arrow being at the bottom of the buffer class). Thus, State 1 shows a large region labeled "Lendable" from which other buffer classes may borrow buffers. All buffers except for those in the "Reserved" region are lendable. While the number of allocated buffers is fewer than the number of reserved buffers, the effective guaranteed buffers are equal to the number of reserved buffers minus the number of allocated buffers. In other words, a number of guaranteed buffers has not yet been established in State 1. Meanwhile, the effective protected buffers is equal to zero. That is, the lendable region may comprise unprotected buffers.

State 2 illustrates a buffer class state where a portion of the reserved buffers have been allocated (i.e., are in use) while the remaining buffers are identified as "Lendable." As in State 1, all buffers except for those in the "Reserved" region are lendable and a number of guaranteed buffers has not yet been established.

State 3 illustrates a buffer class in which a number of allocated buffers is more than the reserved number of buffers but less than the allowance. State 3 further shows the establishment of unprotected, protected, and guaranteed buffers. Here, a sum of the allocated buffers, guaranteed buffers, and protected buffers is less than the allowance due to the presence of unprotected buffers. In State 3, the protected and unprotected buffers are lendable, but lending begin from the unprotected buffers before progressing to the protected buffers. Thus, the effective number of guaranteed buffers and the effective number of protected buffers are equal to the initial number of guaranteed buffers and the initial number of protected buffers because borrowing from these regions has not yet occurred.

State 4 illustrates a buffer class state in which the unprotected buffers from State 3 are now allocated to the buffer class so that a sum of the allocated, guaranteed, and protected buffers is equal to the allowance. In State 4, the protected buffers are lendable and the number of guaranteed and protected buffers has been maintained from State 3.

With reference to FIG. 4, State 4 in FIG. 4 is the same as State 4 from FIG. 3, but is reproduced for convenience of explanation. FIG. 4 shows states of a buffer class at the buffer class progresses from using up its unprotected amount of buffers to using most of its guaranteed amount of buffers (progression is again right to left).

State 5 illustrates that the buffer class has begun to allocate additional buffers from the protected buffers such that the number of protected buffers is fewer than the number of protected buffers in State 4. Thus, a sum of the allocated and guaranteed buffers is less than the allowance. A number of effective guaranteed buffers is still the same as in State 4, but a number of effective protected buffers is fewer than in State 4. For example, the number of effective protected buffers is the allowance minus a sum of the allocated and guaranteed buffers.

State 6 shows that the buffer class has allocated all of its reserved, unprotected and protected buffers so that a sum of the allocated buffers and the guaranteed buffers is equal to the allowance. Here, the buffer class has no lendable buffers and a number of effective guaranteed buffers is the same as in States 4 and 5.

State 7 illustrates that the buffer class has begun to allocate additional buffers from the guaranteed buffers, which are fewer compared to State 6. Thus, a number of allocated buffers is less than the allowance and a number of effective guaranteed buffers is the allowance minus the number of guaranteed buffers. As in State 6, the buffer class has no lendable buffers.

Figure 5:
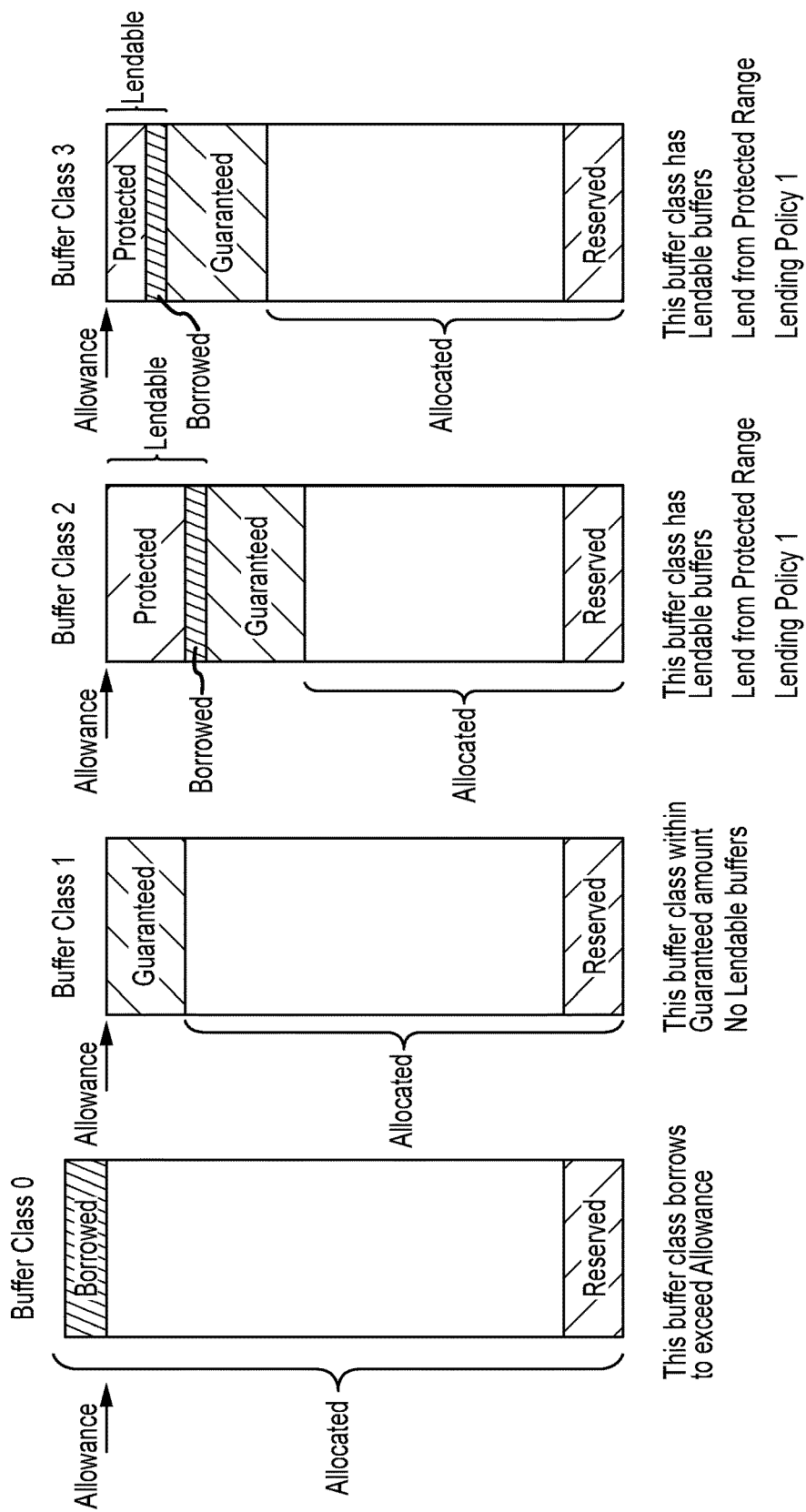
FIGS. 5-7 illustrate a buffer borrowing scheme according to at least one example embodiment.
Figure 6:
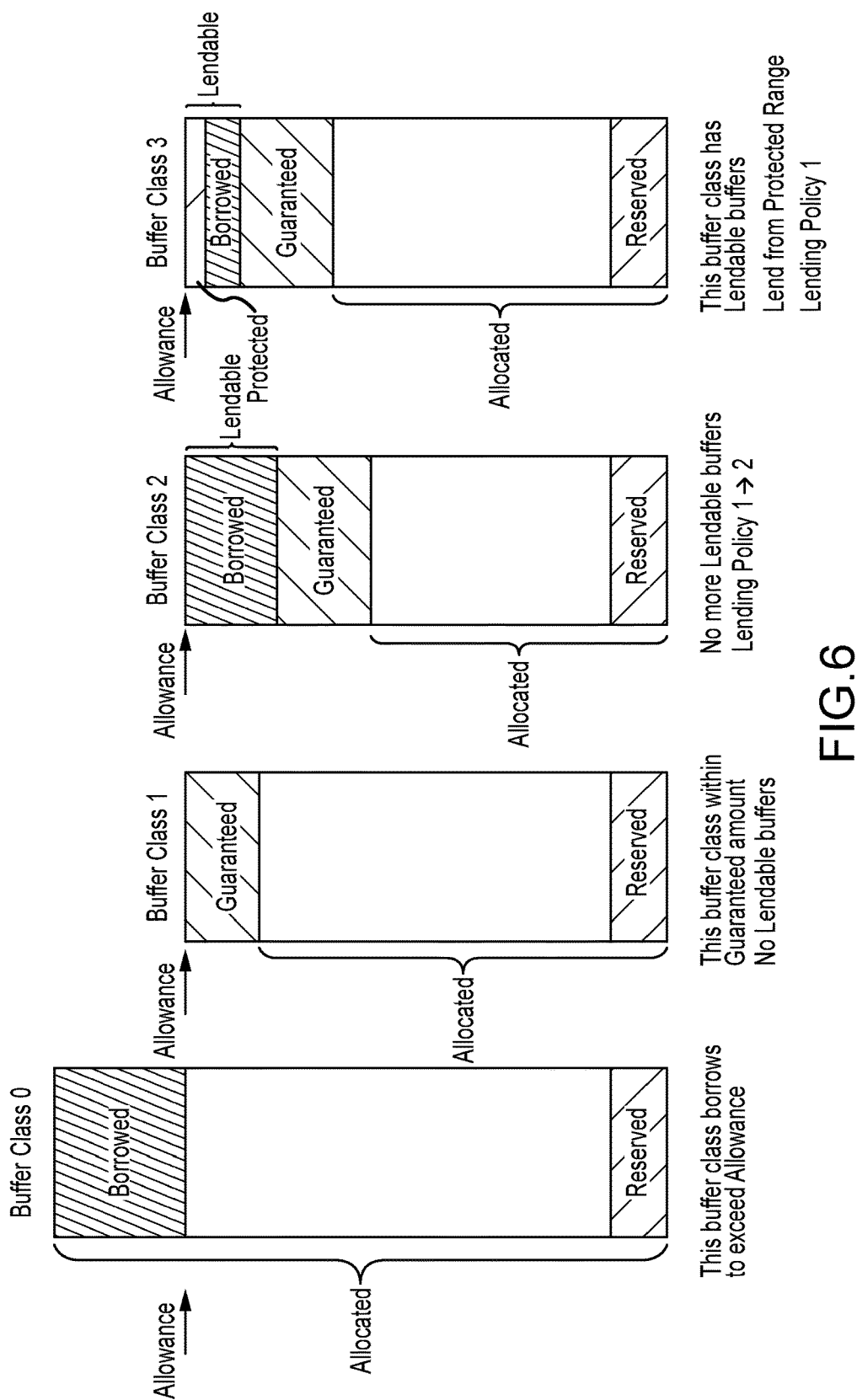
Figure 7:
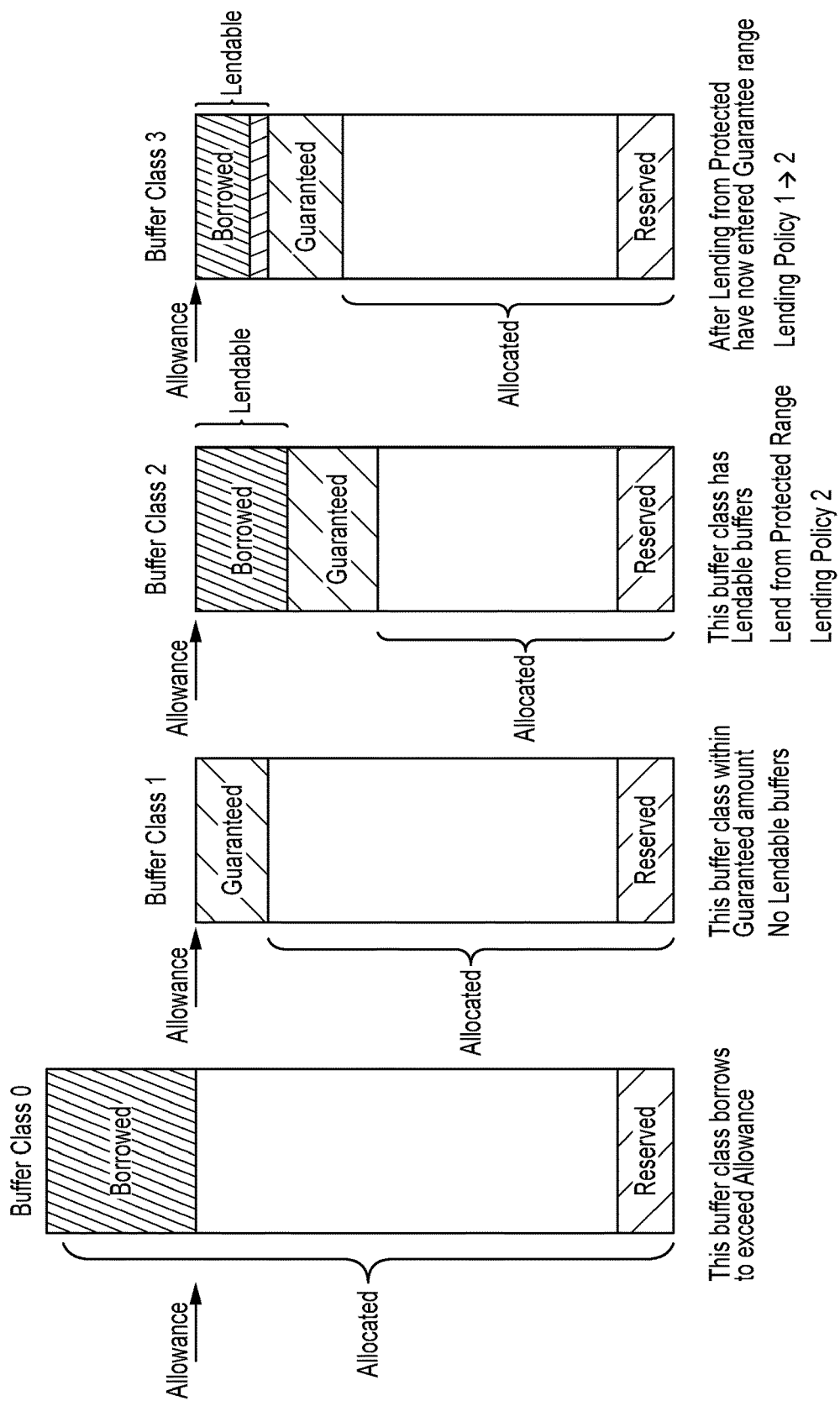

FIGS. 5-7 illustrate a buffer borrowing (or lending) scheme according to at least one example embodiment. FIGS. 5-7 illustrate a buffer borrowing scheme for four Buffer Classes 0-3, but example embodiments are not limited thereto, and the buffer borrowing scheme may be employed with fewer or more buffer classes as desired. For example, FIGS. 5-7 illustrate a progression of states of the Buffer Classes 0-3 as Buffer Class 0 requests additional buffers over its allowance.

In FIG. 5, Buffer Class 0 has allocated its allowance and has begun to borrow buffers from the pool of buffers. Here, Buffer Class 1 has allocated all of its protected and unprotected buffers such that no lendable buffers exist. However, the allocations of Buffer Classes 2 and 3 are such that these two classes still have lendable buffers available in their respective number of protected buffers. Thus, Buffer Class 0 borrows buffers from the pool of buffers earmarked for each protected region of Buffer Classes 2 and 3. Because Buffer Classes 2 and 3 have lendable buffers in their protected buffers, Policy 1 (or Lending Policy 1) applies to these classes. FIG. 5 may be summarized as follows.

Before the borrow: Buffer Class 1 has no lendable buffers; and Buffer Class 2 and Buffer Class 3 have lendable buffers so Lending Policy 1 applies.

After the borrow: Buffer Class 2 remains in Lending Policy 1; Buffer Class 3 remains in Lending Policy 1; Buffer Class 2 and Buffer Class 3 still have lendable buffers remaining.

In FIG. 6, Buffer Class 0 continues to exceed its allowance and to borrow buffers from the pool of buffers.

Before the borrow, Buffer Class states are the same as after the borrow shown in FIG. 5. That is, lendable buffers exist in both Buffer Class 2 and Buffer Class 3 before the borrow.

After the borrow: Buffer Class 2 has transitioned from Lending Policy 1 to Lending Policy 2 because all of the lendable buffers are being borrowed by Buffer Class 0; Buffer Class 3 remains in Lending Policy 1 because Buffer Class 3 still has lendable buffers in the number of protected buffers. Since at least one buffer class (i.e., Buffer Class 3) is in Lending Policy 1, Lending Policy 1 will be applied again when Buffer Class 0 tries to borrow again.

In FIG. 7, Buffer Class 0 continues to exceed its allowance and to borrow buffers.

Before the borrow: lendable buffers are only in Buffer Class 3 (as in FIG. 6).

After the borrow: Buffer Class 2 remains in Lending Policy 2; Buffer Class 3 transitions to Lending Policy 3 because all of its lendable buffers are being borrowed by Buffer Class 0; and no lendable buffers remain in any buffer class.

FIG. 7 illustrates a case where Buffer Class 0 is allowed to borrow more buffers because there were lendable buffers before the borrow, but the amount borrowed by Buffer Class 0 encroaches into the guaranteed number of buffers for Buffer Class 3. This happens only when a lending buffer class (e.g., Buffer Class 3) allocates some more buffers itself, thus squeezing the guaranteed region against the borrowed portion. That is, after the borrow, the guaranteed number of buffers in Buffer Class 3 is fewer than the number of guaranteed buffers shown in FIG. 6 for Buffer Class 3.

In FIGS. 5-7, it should be understood that the Lending Policies associated with Buffer Classes 2 and 3 place limits on the requesting Buffer Class 0. That is, if Buffer Class 0 requests additional buffers from the pool of buffers that affect the ability of the pool of buffers to fulfill a buffer classification (e.g., protected, guaranteed, etc.) of Buffer Classes 2 and 3, then Buffer Class 0 must return a given number of buffers to the pool before being allowed to borrow the additional buffers that are otherwise earmarked for Buffer Classes 2 and 3.

Figure 8:
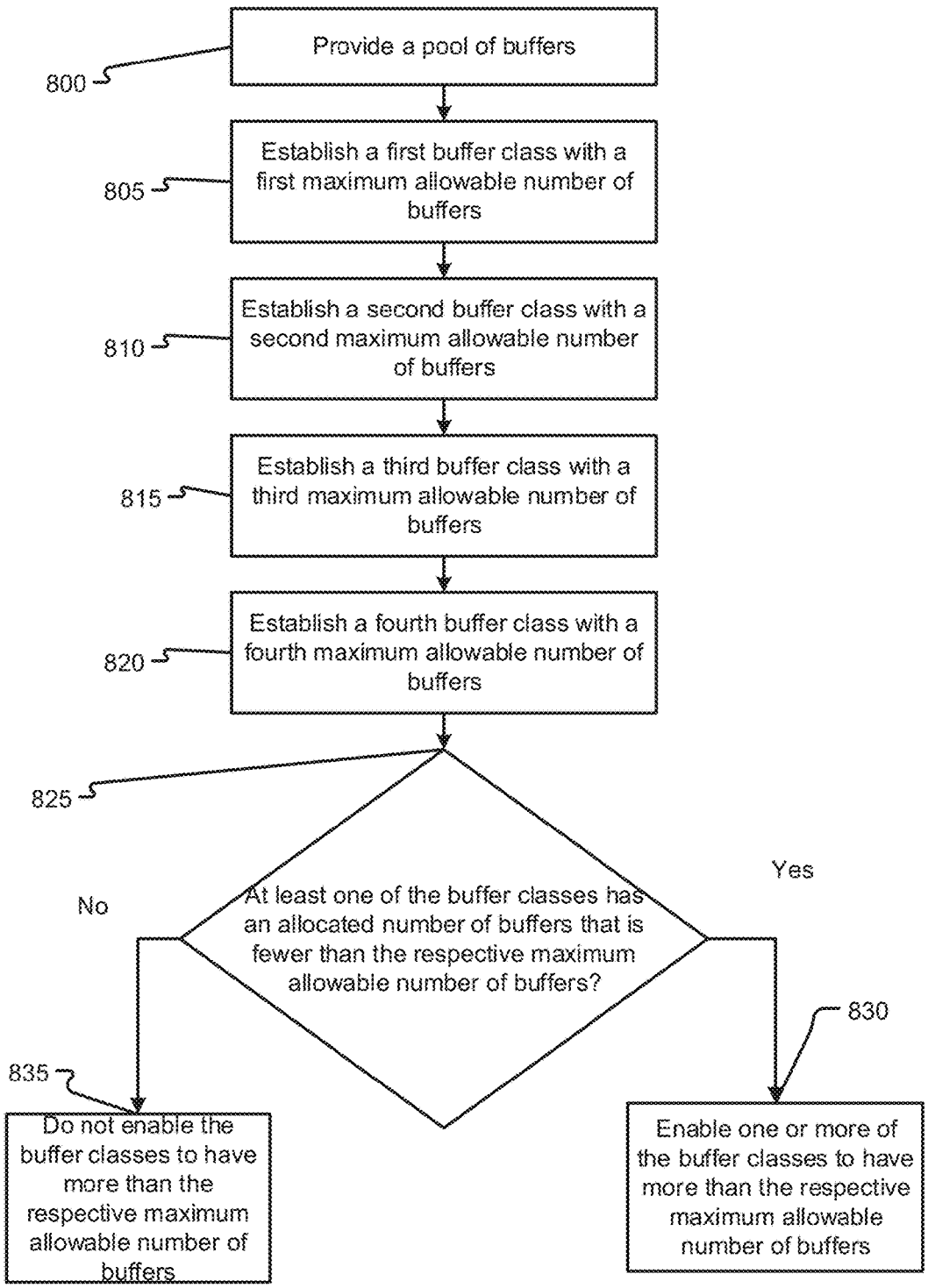
FIG. 8 illustrates example operations of a storage controller to according to at least one example embodiment.

FIG. 8 illustrates example operations for a buffer management scheme carried out by the controller in FIG. 1.

FIG. 8 is a flow diagram of a method for operating the controller 108 described with respect to FIGS. 1-7. While a general order for the steps of the method is shown in FIG. 8, the method can include more or fewer steps or can arrange the order of the steps differently than those shown in FIG. 8. Generally, the method starts at operation 800 and ends at operation 835. The method can be executed as a set of computer-executable instructions executed by the controller 108 and encoded or stored on a computer readable medium. Alternatively, the operations discussed with respect to FIG. 8 may be implemented by the various elements of the controller 108 described with respect to FIGS. 1-7. Hereinafter, the FIG. 8 shall be explained with reference to the systems, components, assemblies, devices, user interfaces, environments, software, etc. described in conjunction with FIGS. 1-7.

In operation 800, the controller 108 provides a pool of buffers, for example in the memory modules 148 of the controller cache 140 in FIG. 1. The pool of buffers comprises a plurality of buffers that are allocatable to a number of different buffer classes (e.g., Buffer Classes 0-3).

In operation 805, the controller 108 establishes (or assigns), from the pool of buffers, a first buffer class that includes a first allowable number of buffers that are allocatable thereto from the pool of buffers. The first buffer class further comprises a first reserved number of buffers that are reserved for the first buffer class in the pool of buffers even if no Input/Output (I/O) operation is running in connection with the first buffer class.

In operation 810, the controller 108 establishes a second buffer class that includes a second allowable number of buffers that are allocatable thereto from the pool of buffers. The second buffer class further comprises a second reserved number of buffers that are reserved for the second buffer class in the pool of buffers even if no I/O operation is running in connection with the second buffer class.

In operation 815, the controller 108 establishes a third buffer class that includes a third allowable number of buffers that are allocatable thereto from the pool of buffers. The third buffer class further comprises a third reserved number of buffers that are reserved for the third buffer class in the pool of buffers even if no I/O operation is running in connection with the third buffer class.

In operation 820, the controller 108 establishes a fourth buffer class that includes a fourth allowable number of buffers that are allocatable thereto from the pool of buffers. The fourth buffer class further comprises a fourth reserved number of buffers that are reserved for the fourth buffer class in the pool of buffers even if no I/O operation is running in connection with the fourth buffer class.

In operation 825, the controller 108 determines whether at least one of the buffer classes comprises a reserved number of buffers that is fewer than the respective allowable number of buffers.

If so, in operation 830, the controller 108 enables one or more of the first, second, third, and fourth buffer classes to freely borrow buffers from one another so that one or more of the buffer classes is allowed to have more than the respective allowable number of buffers.

If not, in operation 835, the controller 108 does not enable one or more of the first, second, third, and fourth buffer classes to freely borrow buffers from one another. That is, a buffer class requesting to borrow buffers above its allowance is not allowed to have more than the respective allowable number of buffers.

According to at least one example embodiment, the first, second, third, and fourth buffer classes are allocated for fast, medium, slow, and low-latency buffer operations (e.g., I/O operations), respectively. Further, the first, second, third, and/or fourth allowable number of buffers are dynamically configurable by firmware of the controller 108 based on I/O activity of the first, second, third, and/or fourth buffer classes.

In some embodiments, third and fourth buffer classes are not desired. In this case, the third and fourth buffer classes are not established (i.e., the controller 108 skips operations 815 and 820), and operation 830 includes enabling the first buffer class to have more than the first allowable number of buffers allocated thereto from the pool of buffers as long as a number of buffers allocated to the second buffer class is fewer than the second allowable number of buffers.

Figure 9:
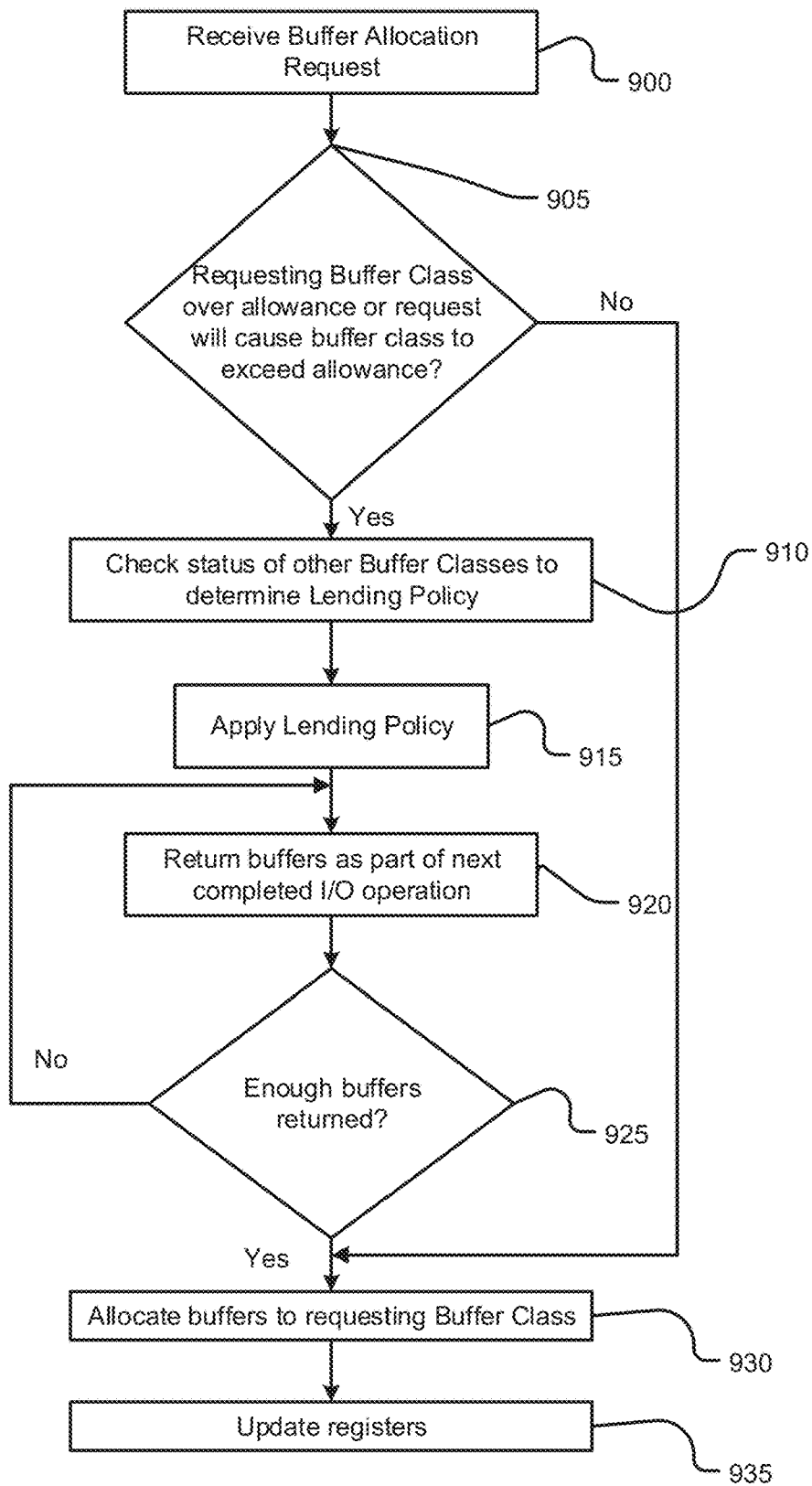
FIG. 9 illustrates example operations of a storage controller according to at least one example embodiment.

FIG. 9 illustrates example operations for a buffer management scheme carried out by the controller in FIG. 1.

FIG. 9 is a flow diagram of a method for operating the controller 108 described with respect to FIGS. 1-8. While a general order for the steps of the method is shown in FIG. 8, the method can include more or fewer steps or can arrange the order of the steps differently than those shown in FIG. 9. Generally, the method starts at operation 900 and ends at operation 935. The method can be executed as a set of computer-executable instructions executed by the controller 108 and encoded or stored on a computer readable medium. Alternatively, the operations discussed with respect to FIG. 9 may be implemented by the various elements of the controller 108 described with respect to FIGS. 1-8. Hereinafter, the FIG. 9 shall be explained with reference to the systems, components, assemblies, devices, user interfaces, environments, software, etc. described in conjunction with FIGS. 1-8.

Once a buffer class is enabled to have more than its respective number of allowable number of buffers in operation 830, the controller m108 may carry out the operations of FIG. 9.

In operation 900, the controller 108 receives a buffer allocation request from one or more buffer classes (a requesting buffer class) to allocate more buffers.

In operation 905, the controller 108 determines whether the requesting buffer class is over its respective allowance or whether fulfilling the request will cause the buffer class to exceed its allowance. If not, the controller performs operation 930, described in more detail below. If so, the controller performs operation 910 to check the status of other buffer classes to determine a Lending Policy (see FIGS. 5-7).

In operation 915, the controller 108 applies the determined Lending Policy, and in operation 915, the requesting buffer class returns buffers in accordance with the Lending Policy. For example, the requesting buffer class returns buffers as part of a next I/O operation.

In operation 925, the controller 108 determines whether the requesting buffer class has returned enough buffers to proceed with fulfilling the allocation request. For example, the controller 108 determines whether the requesting buffer class returned the number of buffers indicated by the Lending Policy. If so, the controller 108 proceeds to operation 930 to allocate buffers from the pool of buffers to the requesting buffer class. If not, then the controller 108 returns to operation 920.

In the event that operation 910 reveals that a Lending Policy does not apply (e.g., when the allocated buffers of all other buffers classes are below their respective allowances), then the controller skips operations 915, 920, and 925.

In operation 935, the controller 108 updates the registers 262 based on the new configuration of buffer classes. As noted above, the registers 262 are used to track and/or set the classifications of buffers (e.g., guaranteed, protected, unprotected, etc.) within each buffer class, and to track and/or set various lending policies. For example, the registers maintain at least one of i) one or more buffer lending policies in connection with one or more of the first, second, third, and fourth buffer classes; ii) a buffer-to-be-returned count for each of the one or more buffer lending policies that indicates a number of buffers that need to be returned to the pool of buffers before a buffer class is allowed to have more buffers allocated thereto; iii) a number of guaranteed buffers for the first, second, third, and/or fourth buffer classes, respectively; iv) a buffer allocation count for each of the first, second, third, and/or fourth buffer classes that indicates a current number of buffers allocated to the first, second, third, and/or fourth buffer classes from the pool of buffers, respectively; and v) a number of protected buffers for the first, second, third, and/or fourth buffer classes, respectively.

The one or more buffer lending policies enable buffer lending between buffer classes even if a buffer class has more buffers allocated thereto than is allowed by the respective allowable number of buffers. The number of guaranteed buffers is changeable in response to an amount of I/O activity experienced by the first, second, third, and fourth buffer classes. In one embodiment, the number of guaranteed buffers is greater than the reserved number of buffers for each buffer class. The number of protected buffers are changeable in response to the number of buffers allocated to the first, second, third and/or fourth buffer classes reaching the respective allowable number of buffers. For example, the number of protected buffers decreases as the number of buffers allocated to a buffer class gets closer to the respective allowable number of buffers.

The above described buffer management scheme, which may include forcing a buffer class to return some buffers before allocating more buffers, has several advantages. Firstly, the scheme ensures that that the requesting buffer class is working properly because buffers are recycled to indicate that the requesting buffer class is not stuck in a borrow-only state. Secondly, the scheme provides increasing delay/resistance as a buffer class grows above its allowance (and encroaches into other buffer classes), while still allowing the requesting buffer class to grow when other classes have unutilized or lendable buffers. Thirdly, when a dormant buffer class is reactivated, the reactivated buffer class should have some buffers to start working with (coming from reserved/guaranteed pools), and eventually, Lending Policy 3 ensures that other buffer classes shrink so that the reactivated buffer class can now grow. Finally, even while the other buffer classes are shrinking, the borrowing buffer classes can still allocate some buffers (maybe after returning a lot more), which reduces I/O timeouts.

It should be understood that there can be several variations of the inventive concepts discussed above, including variations in a number of buffer classes, number and classifications of regions for a given buffer class (e.g., reserved, guaranteed, protected, etc.), and variations in the number and interpretations of lending policies. For example, instead of forcing an oversubscribed buffer class to return some buffers, a lending policy could require the requesting buffer class to wait for a period of time, skip some buffer allocation cycles, and/or the like.

While example embodiments have been described for buffers in a cached environment, example embodiments may apply to other kinds resource management, such as frame management or the like.

It should be appreciated that example embodiments provide a self-controlled feedback based buffer management solution that has several advantages: i) reduced buffer waste—if a buffer class is not active, its lendable and protected regions can be used by an active buffer class; ii) buffer movement from buffer class to buffer class occurs smoothly based on actual demand—no manual intervention/polling needed; iii) buffer starving is reduced for the borrowing buffer class and/or the lending buffer classes, and each buffer class can proceed under all circumstances; and iv) a user can have fined grained control on buffer class behavior by configuring the classifications and lending policies in advance and/or in real time without the need to constantly monitor the system (i.e., once configured, the system runs autonomously).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for managing buffers in a cached environment, the method comprising:
    providing a pool of buffers, the pool of buffers comprising a plurality of buffers that are allocatable to a number of different buffer classes;
    establishing a first buffer class that includes a first allowable number of buffers that are allocatable thereto from the pool of buffers, the first buffer class further comprising a first reserved number of buffers that are reserved for the first buffer class in the pool of buffers even if no Input/Output (I/O) operation is running in connection with the first buffer class;
    establishing a second buffer class that includes a second allowable number of buffers that are allocatable thereto from the pool of buffers, the second buffer class further comprising a second reserved number of buffers that are reserved for the second buffer class in the pool of buffers even if no I/O operation is running in connection with the second buffer class; and
    enabling the first buffer class to have more than the first allowable number of buffers allocated thereto from the pool of buffers as long as a number of buffers allocated to the second buffer class is fewer than the second allowable number of buffers.

2. The method of claim 1, wherein a first buffer allocation count is maintained for the first buffer class that indicates a current number of buffers allocated to the first buffer class from the pool of buffers, and wherein a second buffer allocation count is maintained for the second buffer class that indicates a current number of buffers allocated to the second buffer class from the pool of buffers.

3. The method of claim 2, wherein a first buffer-to-be-returned count is maintained for the first buffer class that indicates a number of buffers be returned to the pool of buffers before the first buffer class is allowed to have more buffers allocated thereto.

4. The method of claim 1, further comprising:
    establishing a third buffer class that includes a third allowable number of buffers that are allocatable thereto from the pool of buffers, the third buffer class further comprising a third reserved number of buffers that are reserved for the third buffer class in the pool of buffers even if no I/O operation is running in connection with the third buffer class;
    establishing a fourth buffer class that includes a fourth allowable number of buffers that are allocatable thereto from the pool of buffers, the fourth buffer class further comprising a fourth reserved number of buffers that are reserved for the fourth buffer class in the pool of buffers even if no I/O operation is running in connection with the fourth buffer class; and
    enabling one or more of the first, second, third, and fourth buffer classes to freely borrow buffers from one another as long as at least one of the buffer classes having a buffer borrowed therefrom comprises an allocated number of buffers that is fewer than the respective allowable number of buffers.

5. The method of claim 4, wherein the first, second, third, and fourth buffer classes are allocated for fast, medium, slow, and low-latency buffer operations, respectively.

6. The method of claim 4, further comprising:
    maintaining one or more buffer lending policies in connection with one or more of the first, second, third, and fourth buffer classes, the one or more buffer lending policies enabling buffer lending between buffer classes even if a buffer class has more buffers allocated thereto than is allowed by the respective allowable number of buffers.

7. The method of claim 1, further comprising:
    maintaining a first number of guaranteed buffers for the first buffer class, the first number of guaranteed buffers being changeable in response to an amount of I/O activity experienced by the first buffer class.

8. The method of claim 7, wherein the first number of guaranteed buffers is greater than the first reserved number of buffers.

9. The method of claim 7, further comprising:
    maintaining a first number of protected buffers for the first buffer class, the first number of protected buffers being changeable in response to the number of buffers allocated to the first buffer class reaching the first allowable number of buffers, wherein the first number of protected buffers decreases as the number of buffers allocated to the first buffer class gets closer to the first allowable number of buffers.

10. The method of claim 1, wherein the first allowable number of buffers is dynamically configurable by firmware of a storage controller based on I/O activity of the first buffer class and the second buffer class.

11. A storage controller, comprising:
a cache including a pool of buffers;
at least one host interface to receive, from a host, requests to perform I/O operations;
a processor; and
a memory coupled to the processor and including processor executable instructions, the instructions including:
buffer manager instructions to assign the pool of buffers to a first buffer class and a second buffer class such that i) the first buffer class includes a first allowable number of buffers that are allocatable thereto from the pool of buffers, ii) the first buffer class includes a first reserved number of buffers that are reserved for the first buffer class in the pool of buffers even if no (I/O) operation is running in connection with the first buffer class, iii) the second buffer class includes a second allowable number of buffers that are allocatable thereto from the pool of buffers, and iv) the second buffer class includes a second reserved number of buffers that are reserved for the second buffer class in the pool of buffers even if no I/O operation is running in connection with the second buffer class,
wherein the buffer manger instructions enable the first buffer class to have more than the first allowable number of buffers allocated thereto from the pool of buffers as long as a number of buffers allocated to the second buffer class is fewer than the second allowable number of buffers.

12. The storage controller of claim 11, further comprising:
one or more registers to maintain a first buffer allocation count for the first buffer class that indicates a current number of buffers allocated to the first buffer class from the pool of buffers, and to maintain a second buffer allocation count for the second buffer class that indicates a current number of buffers allocated to the second buffer class from the pool of buffers.

13. The storage controller of claim 11, wherein the buffer manager instructions further comprise instructions to assign the pool of buffers to a third buffer class and a fourth buffer class such that i) the third buffer class includes a third allowable number of buffers that are allocatable thereto from the pool of buffers, ii) the third buffer class includes a third reserved number of buffers that are reserved for the third buffer class in the pool of buffers even if no I/O operation is running in connection with the third buffer class, iii) the fourth buffer class includes a fourth allowable number of buffers that are allocatable thereto from the pool of buffers, and iv) the fourth buffer class includes a fourth reserved number of buffers that are reserved for the fourth buffer class in the pool of buffers even if no I/O operation is running in connection with the fourth buffer class, and
wherein the buffer manager instructions enable one or more of the first, second, third, and fourth buffer classes to freely borrow buffers from one another as long as at least one of the buffer classes having a buffer borrowed therefrom comprises an allocated number of buffers that is fewer than the respective allowable number of buffers.

14. The storage controller of claim 13, further comprising:
one or more registers to maintain one or more buffer lending policies in connection with one or more of the first, second, third, and fourth buffer classes, the one or more buffer lending policies enabling buffer lending between buffer classes even if a buffer class has more buffers allocated thereto than is allowed by the respective allowable number of buffers.

15. The storage controller of claim 14, wherein the one or more registers maintain a first buffer-to-be-returned count for each of the one or more buffer lending policies that indicates a number of buffers to be returned to the pool of buffers before a buffer class is allowed to have more buffers allocated thereto.

16. The storage controller of claim 13, further comprising:
one or more registers to maintain a number of guaranteed buffers for the first, second, third, and fourth buffer classes, the number of guaranteed buffers being changeable in response to an amount of I/O activity experienced by the first, second, third, and fourth buffer classes.

17. A storage system, comprising:
a pool of buffers;
one or more storage devices; and
a storage controller to read and write data from/to the one or more storage devices using the pool of buffers, wherein the storage controller includes:
a processor; and
a memory coupled to the processor and including processor executable instructions, the instructions including:
buffer manager instructions to assign the pool of buffers to a first buffer class and a second buffer class such that i) the first buffer class includes a first allowable number of buffers that are allocatable thereto from the pool of buffers, ii) the first buffer class includes a first reserved number of buffers that are reserved for the first buffer class in the pool of buffers even if no read or write operation is running in connection with the first buffer class, iii) the second buffer class includes a second allowable number of buffers that are allocatable thereto from the pool of buffers, and iv) the second buffer class includes a second reserved number of buffers that are reserved for the second buffer class in the pool of buffers even if no read or write operation is running in connection with the second buffer class,
wherein the buffer manger instructions enable the first buffer class to have more than the first allowable number of buffers allocated thereto from the pool of buffers as long as a number of buffers allocated to the second buffer class is fewer than the second allowable number of buffers.

18. The storage system of claim 17, wherein the buffer manager instructions further comprise instructions to assign the pool of buffers to a third buffer class and a fourth buffer class such that i) the third buffer class includes a third allowable number of buffers that are allocatable thereto from the pool of buffers, ii) the third buffer class includes a third reserved number of buffers that are reserved for the third buffer class in the pool of buffers even if no I/O operation is running in connection with the third buffer class, iii) the fourth buffer class includes a fourth allowable number of buffers that are allocatable thereto from the pool of buffers, and iv) the fourth buffer class includes a fourth reserved number of buffers that are reserved for the fourth buffer class in the pool of buffers even if no I/O operation is running in connection with the fourth buffer class, and wherein the buffer manager instructions enable one or more of the first, second, third, and fourth buffer classes to freely borrow buffers from one another as long as at least one of the buffer classes having a buffer borrowed therefrom comprises an allocated number of buffers that is fewer than the respective allowable number of buffers.

19. The storage system of claim 18, wherein the first, second, third, and fourth buffer classes are allocated for fast, medium, slow, and low-latency buffer operations, respectively.

20. The storage system of claim 18, further comprising: one or more registers to at least one of:

maintain one or more buffer lending policies in connection with one or more of the first, second, third, and fourth buffer classes, the one or more buffer lending policies enabling buffer lending between buffer classes even if a buffer class has more buffers allocated thereto than is allowed by the respective allowable number of buffers;

maintain a buffer-to-be-returned count for each of the one or more buffer lending policies that indicates a number of buffers to be returned to the pool of buffers before a buffer class is allowed to have more buffers allocated thereto;

maintain a number of guaranteed buffers for the first, second, third, and fourth buffer classes, respectively, the number of guaranteed buffers being changeable in response to an amount of I/O activity experienced by the first, second, third, and fourth buffer classes;

maintain a buffer allocation count for each of the first, second, third, and fourth buffer classes that indicates a current number of buffers allocated to the first, second, third, and fourth buffer classes from the pool of buffers, respectively; and maintain a number of protected buffers for the first, second, third, and fourth buffer classes, respectively, the number of protected buffers being changeable in response to the number of buffers allocated to the first, second, third and fourth buffer classes reaching the respective allowable number of buffers, wherein the number of protected buffers decreases as the number of buffers allocated to a buffer class gets closer to the respective allowable number of buffers.

* * * * *